Aug. 9, 1960

E. M. NOEL

CONTINUOUS GRIDDLE

Re. 24,855

Original Filed Oct. 21, 1954

3 Sheets-Sheet 1

INVENTOR:

EUGENE M. NOEL

BY

Rummler, Rummler & Snow

ATT'YS

CONTINUOUS GRIDDLE
Original Filed Oct. 21, 1954 3 Sheets-Sheet 2
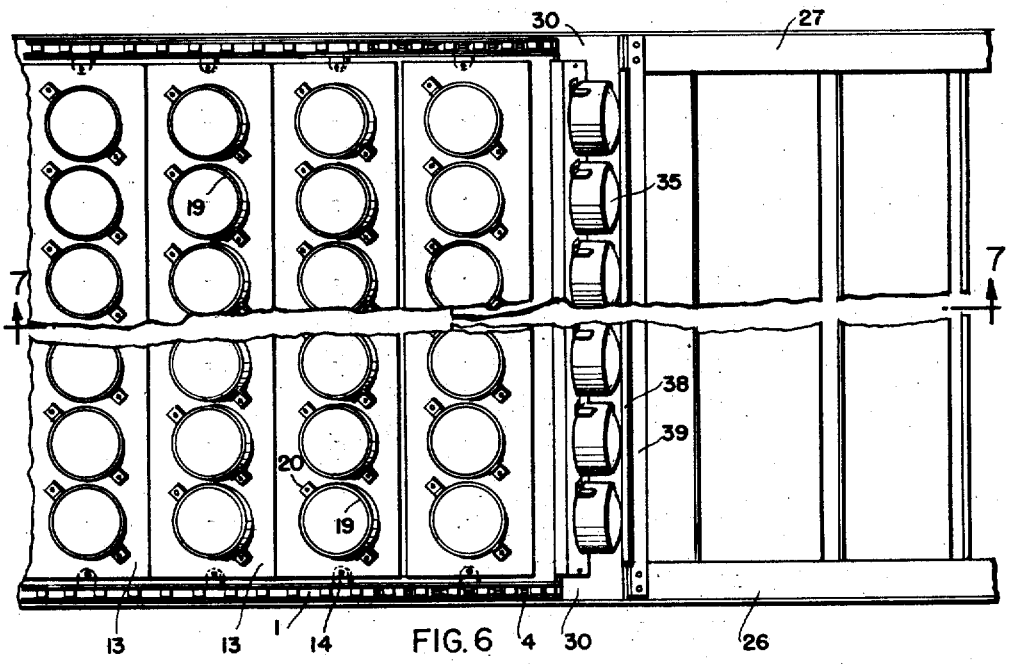
FIG. 6
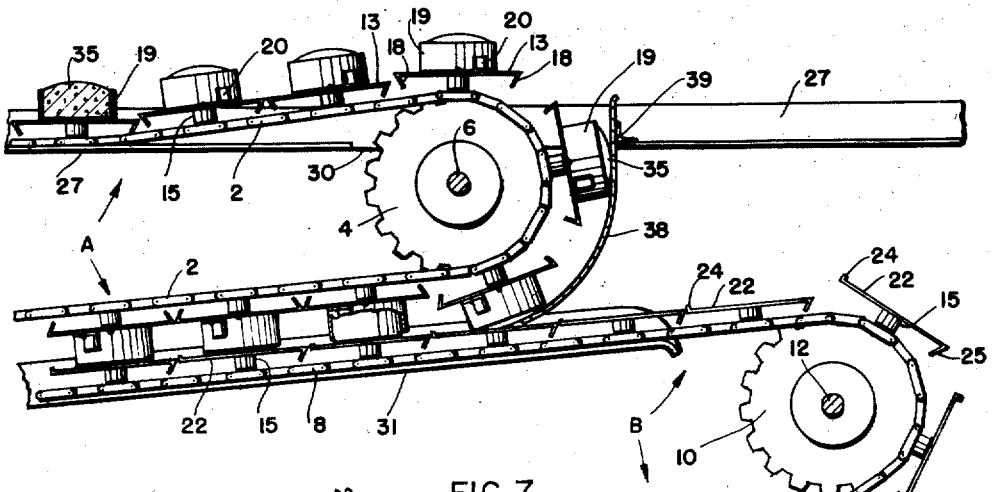
FIG. 7
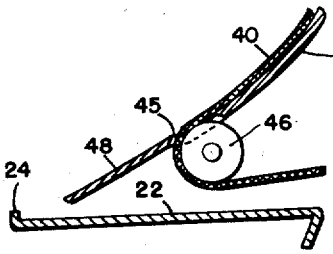
FIG. 11
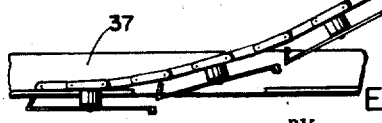
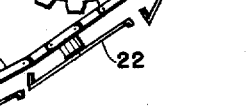
INVENTOR:
EUGENE M. NOEL
BY
Rummler, Rummler & Snow
ATT'YS

CONTINUOUS GRIDDLE

Original Filed Oct. 21, 1954 3 Sheets-Sheet 3

INVENTOR:
EUGENE M. NOEL

BY
Rummler, Rummler & Snow
ATT'YS

United States Patent Office

Re. 24,855
Reissued Aug. 9, 1960

24,855

CONTINUOUS GRIDDLE

Eugene M. Noel, Cambridge, Mass.

Original No. 2,859,713, dated Nov. 11, 1958, Ser. No. 463,680, Oct. 21, 1954. Application for reissue Jan. 7, 1960, Ser. No. 1,147

14 Claims. (Cl. 107—57)

Matter enclosed in heavy brackets [ ] appears in the original patent but forms no part of this reissue specification; matter printed in italics indicates the additions made by reissue.

This invention relates to continuous griddles of the conveyor type, and particularly to improvements in such devices for automatically grilling, cooking or baking English muffins and the like, and then delivering the finished end products onto a transfer conveyor where the end products are delivered for cooling and packaging.

In particular this invention concerns an improved apparatus for grilling, cooking or baking properly proportioned ingredients suitably combined to give a resultant dough which, upon being divided into individual units of predetermined weight and deposited upon or within certain novel components of the apparatus, will be automatically processed to produce completed end products ready for packaging and shipment, the entire processing operation being carried out automatically and without hand manipulation to produce superior end products having uniformly grilled, baked or cooked, top and bottom surfaces and other improved characteristics.

The main objects of this invention are to provide an improved continuous griddle for grilling, baking or cooking English muffins and other specialty food products which are grilled, baked or cooked on one or both sides; to provide such a device whereby the articles being processed are formed, transported, turned over, and brought to completion of the process without any jarring, bumping or other agitation that might adversely affect the finished product; to provide an improved means for forming and transporting the article units being processed; to provide an improved means for turning the article units being processed, to grill or bake both sides of the same, as the units are transferred from a first conveyor section traveling in one direction to a second conveyor section traveling in the opposite direction; to provide an improved means and arrangement for maintaining uniform, controlled cooking temperatures throughout the several processing sections of the apparatus and varying such temperatures from section to section in accordance with the requirements of the articles being processed; to provide an improved continuous griddle having means for forming and processing identical grilled, baked or cooked food products individually, in large quantities, and at a relatively high production rate; and to provide an improved continuous griddle which will produce superior quality end products, having uniformly grilled, baked or cooked, top and bottom surfaces, with bland but strong side surfaces and with greatly improved interior cell structure retaining optimum gas expansion.

Figures 1, 2, 3, 4, 5:
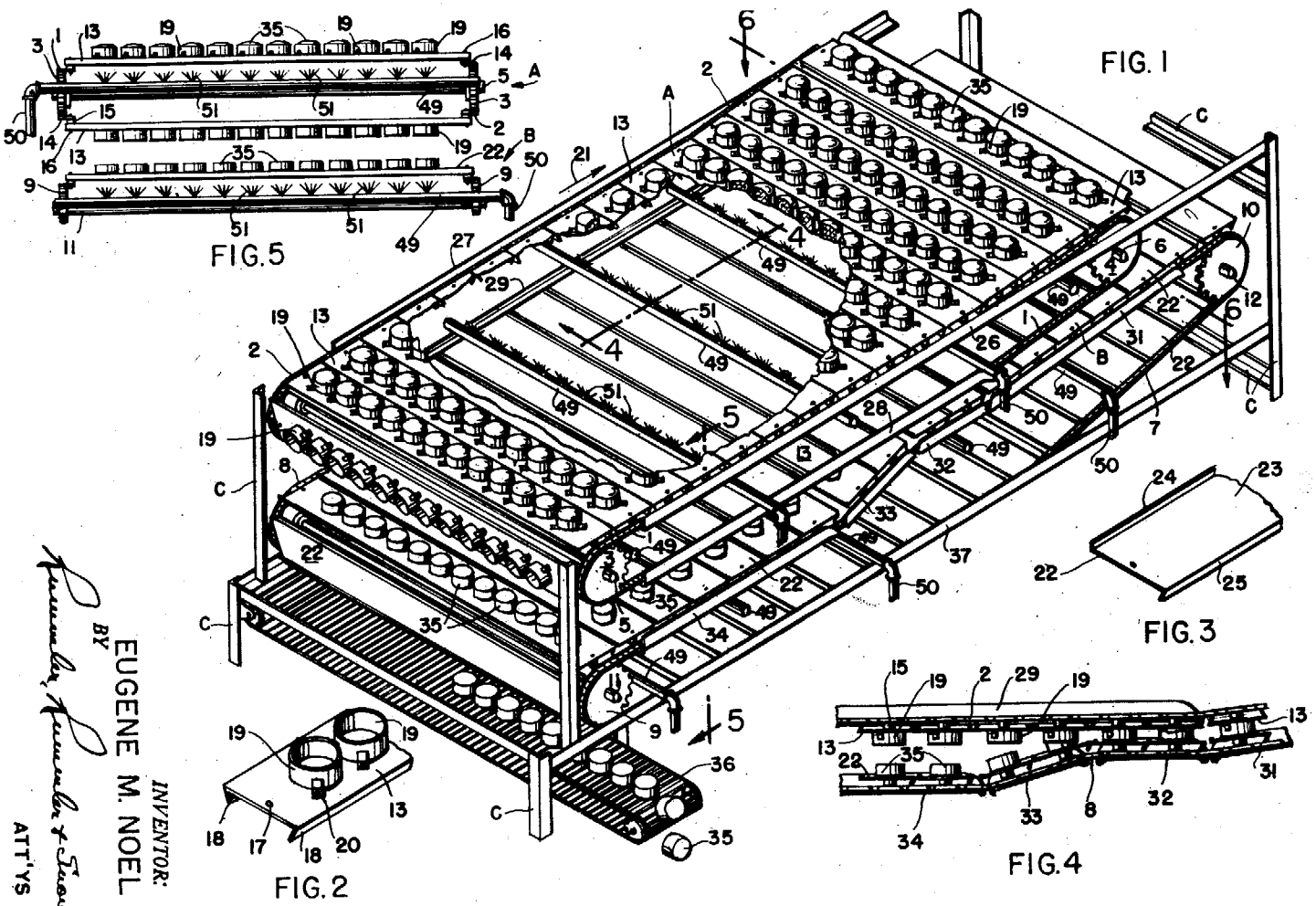
Figure 8:
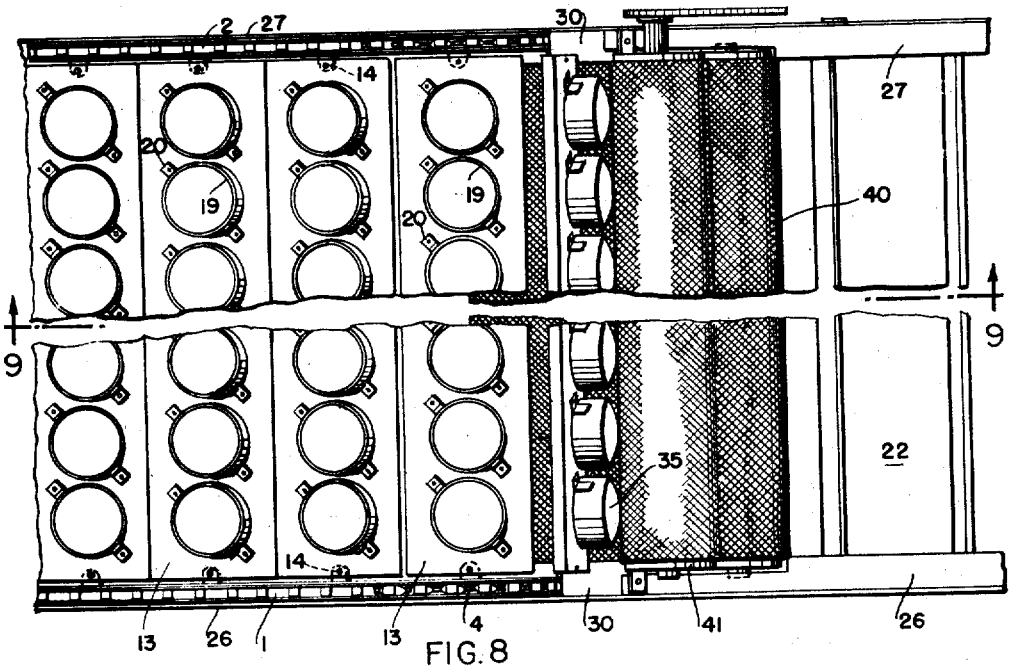
Figure 9:
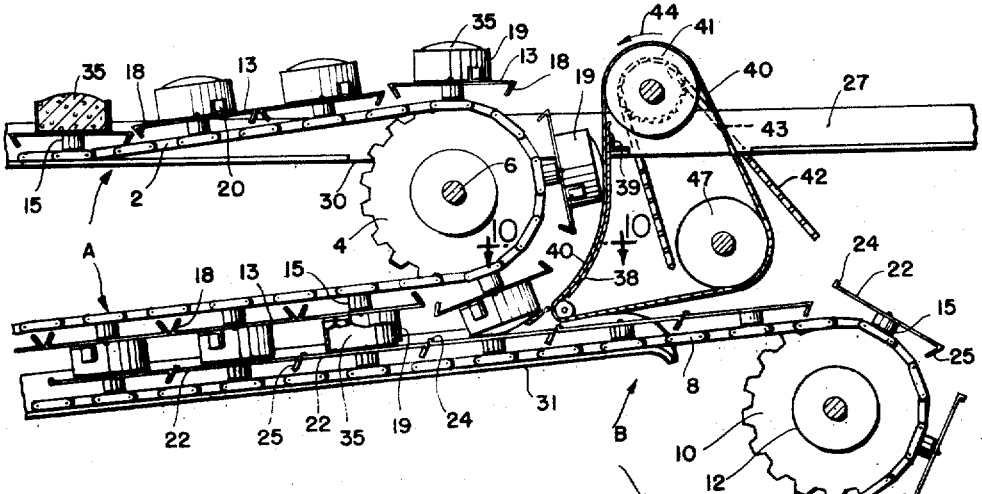
Figure 10:
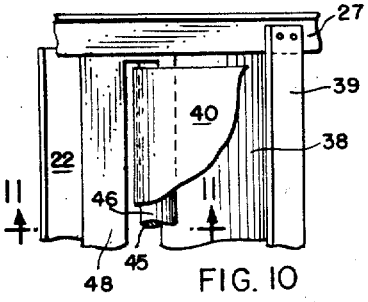

A specific embodiment of this invention is shown in the accompanying drawings in which:

Figure 1 is a schematic perspective view of my improved continuous griddle, illustrating the arrangement of its mechanical components, Fig. 2 is a fragmentary perspective view showing a portion of a single conveyor flight element and the arrangement thereon of removable individual dough holding and product forming rings, Fig. 3 is a fragmentary perspective view of a portion of one of the flight elements of a second conveyor onto which the articles being processed are delivered from a first conveyor after having been formed and baked on one side, Fig. 4 is a fragmentary longitudinal sectional view of the apparatus, as taken on line 4—4 of Fig. 1, showing the relationship of the upper and lower conveyors during the transfer phase wherein the articles being processed are reversed and transferred from one conveyor to another, Fig. 5 is a fragmentary transverse sectional view, as taken on line 5—5 of Fig. 1 above the bottom run of the lower conveyor, showing an arrangement of gas burning heating means and the manner in which heat is applied and directed toward specific areas of the grilling elements of the apparatus for the uniform grilling or baking of the products being processed, Fig. 6 is a fragmentary top plan view of the improved continuous griddle as taken on line 6—6 of Fig. 1 at the rear or transfer end of the machine, Fig. 7 is a longitudinal sectional view of the same as taken on line 7—7 of Fig. 6, showing the operational relationship of the machine parts for effecting reversal and transfer of the article units being processed and further illustrating the form and construction of the upper and lower conveyor, Fig. 8 is a fragmentary top plan view of the rear or transfer end of a continuous griddle, like Fig. 6, but showing a modified arrangement for effecting reversal and transfer of the articles being processed from the upper to the lower conveyors, Fig. 9 is a fragmentary sectional elevation on the same as taken on line 9—9 of Fig. 8, Fig. 10 is a fragmentary plan view as taken on line 10—10 of Fig. 9 showing the transfer belt and guide means, the transfer belt being partly broken away to show the guide means construction, and Fig. 11 is an enlarged fragmentary sectional elevation as taken on line 11—11 of Fig. 10.

In the form shown in the drawings, and particularly in the schematic illustration of Fig. 1 the improved continuous griddle of my invention comprises upper and lower conveyors A and B respectively, disposed horizontally one above the other and operating in opposite directions, which conveyors are mounted in a suitable supporting frame C of generally rectangular form and fabricated of conventional structural elements; the frame C including suitable vertical and horizontal members, not shown, for supporting the conveyor mechanism and the other components of the machine as well as suitable wall panels, also not shown, for enclosing the sides and ends of the machine so as to provide a neat external and oven-like appearance.

As shown, the upper conveyor A comprises a pair of endless chains 1 and 2, operating between suitable drive sprockets 3 and 4, which in turn are mounted fast on suitable laterally spaced and parallel drive shafts 5 and 6; and the lower conveyor B comprises a pair of endless chains 7 and 8 operating between suitable drive sprockets 9 and 10 mounted fast on laterally spaced shafts 11 and 12 which are also parallel with the drive shafts 5 and 6. It will be understood that the drive shafts 5, 6 and 11, 12 are journaled in and supported by suitable bearings, not shown, carried by the main frame structure and, as will be understood by those having experience in this art, one drive shaft of each of the conveyors, for example, the drive shafts 5 and 11, will be positively driven by a suitable variable speed drive mechanism, also not shown, in opposite directions at a continuous and equal speed.

As shown, the load carrying area of the upper conveyor A comprises a plurality of relatively narrow, transversely extending plates or flight members 13, disposed side by side and extending between the chains 1 and 2, which plates are of sufficient number and of such width as to form a substantially continuous segmental endless belt running between the sprockets 3 and 4. Each of the plates 13 is of a length slightly less than the transverse distance between the inner side surface of the chains 1 and 2, and each of the plates is attached endwise to the chains 1 and 2, by means of inwardly projecting bracket members 14, see Fig. 5, which bracket members are integral with spaced links of the conveyor chains and carry spacer members 15 on their inwardly projecting ends. The spacer members 15 hold the plates 13 outwardly from the chains 1 and 2, and each of the plates 13 is mounted on the spacer members 15 by means of suitable bolts 16 extending through end apertures 17 located on the longitudinal centerline of the plate. See Fig. 2.

In the form shown, each of the plates 13, comprising the web of the conveyor A, is formed of heavy gauge sheet metal with a flat upper or outer surface, and the longitudinal margins 18 of each plate are turned downwardly and inwardly, through an angle of about 120°, so that each plate or conveyor flight is in the form of an inverted channel having inwardly converging sides. This form of the conveyor flights is clearly shown in Figs. 2, 7 and 9 of the drawings, and serves a definite purpose as will be hereinafter described.

Also, the top or outer surface of each conveyor flight 13 is provided with a plurality of individually removable product forming elements 19, arranged side-by-side in series along the centerline of the conveyor flight and substantially from end to end of the flight. These elements or forms 19 are fabricated of sheet metal and are ordinarily annular or rectangular in form with uniformly parallel top and bottom edges so that the forms will rest endwise in complete peripheral contact with the face surface of the conveyor flight on which they are mounted. The particular forming elements shown in the drawings are made as rings and are each provided with a pair of diametrically opposed external mounting lugs 20, by means of which the rings are removably secured onto the outer surfaces of the conveyor flights 13 by suitable bolts or screws. The function of these elements or rings is to retain the dough balls from which the goods being processed are made, and to shape the product as the dough balls expand and are grilled during the first half of the processing procedure. The rings 19 are removable for ready replacement or change of ring size according to the nature of the product to be made, and facilitate cleaning of the rings and conveyor flights.

As shown in Fig. 1, the top run of the conveyor A travels horizontally along the top of the machine in the direction from front to rear, as indicated by the arrow 21, and at the rearward end of the machine the conveyor web turns over the sprockets 4 where the flights 13 come into face to face relation with the top run of the lower conveyor B. Suitable transfer means to be later described are provided at the rearward end of the machine to retain the article being processed in the forming rings 19 as the conveyor flights become inverted while passing around the sprockets 4, and, as shown in Figs. 7 and 9, the vertical spacing between the bottom run of the conveyor A and the top run of the conveyor B, at the point where the conveyor flights 13 become fully inverted, is such that the outer edges of the forming rings 19 will come substantially into contact with the adjacent surfaces of the flights 22 comprising web of the lower conveyor B.

As shown in the drawings, the lower conveyor B, is of a construction similar to that of the upper conveyor A, with the exception that the conveyor B is somewhat longer than the conveyor A, and the individual flights 22, which comprise the segmental web of the conveyor B, are of somewhat different form. The form of the flights 22 of the lower conveyor is shown in Fig. 3, as well as in Figs. 7 and 9, and it will be observed that while the length and width is the same as the flights 13 the working or outer face 23 of each of these conveyor flights is provided with an upstanding flange 24 along its leading edge, and that the trailing edge of each conveyor flight 22 is provided with a downwardly projecting flange 25 which, like on the conveyor flights 13, converge inwardly toward the centerline of the conveyor flight with an included angle of substantially 60°. The conveyor flights 22 are mounted on the chains 7 and 8, in outwardly spaced relation therewith by means of chain brackets and spacer members in the same way that the flights 13 are mounted on the chains 1 and 2 of the upper conveyor A. Also, flights 22 of the lower conveyor B, are spaced along the lengths of the chains 7 and 8 with precisely the same centerline spacing as in the case of the flights 13 on the upper conveyor A. Thus, since the conveyors A and B operate at the same speed in directions opposite each other, the bottom run of the conveyor A and the top run of the conveyor B will travel in the same direction parallel with each other and the individual conveyor flights 13 and 22 can be brought into precisely aligned face to face relation with each other when the two conveyor webs come together.

It is a feature of this invention to have the individual flights of the two conveyors come together in mutually registering face to face relation, and it will therefore be understood that the relative lengths of the two conveyors will be such that this will occur and that the two conveyors will be driven at the same lineal speed so that mutual registration of the individual flights of the two conveyor webs, at the rearward end of the machine, will be maintained continuously. This relationship of the individual flights of the two conveyors at the rearward end of the machine is clearly shown by Figs. 4, 7 and 9 of the drawings.

In order to support the several conveyor chains between their respective sprockets, a plurality of appropriate guide means or trackways are provided in the machine structure, which trackways or guide means may be supported by any suitable structure, not shown, included in the main supporting framework C. The location and relation of the several guide means or chain tracks is shown in the schematic perspective view of Fig. 1.

As shown a pair of angle members 26 and 27 extending longitudinally of the machine are provided for supporting the top run of the upper conveyor A, and a second pair of angle members 28 and 29, disposed parallel with and vertically below the angle members 26 and 27, respectively, are provided for supporting the bottom run of the conveyor A. These angle members are mounted with their horizontal legs bottommost and projecting inwardly of the machine, so that the conveyor chains will be supported vertically and at the same time held against laterally outward displacement, and, as indicated at 30 in Figs. 6, 7, 8 and 9, the inwardly projecting legs of the members 26 and 27 are cut away at appropriate places to provide clearance for the chain sprockets and the turning of the conveyor flights as they pass from the upper to the lower run. The trackway or support for the top run of the lower conveyor B is likewise made of angle members mounted with the bottom legs projecting inwardly of the machine to provide guide surfaces along which the chains 7 and 8 can run, and in the form shown this support comprises a series of angle members 31, 32, 33, and 34, disposed end to end and extending longitudinally of the machine on each side, but along a generally downward broken path so that the conveyor flights 22 in the top run of the conveyor B will be at varying distances vertically from the flights 13 in the bottom run of the conveyor A. Thus, as shown in Fig. 1, and indicated in Figs. 4, 7 and 9, the conveyor track or chain support member 31 is inclined forwardly and downwardly with respect to the length of the machine; the track member 32 is disposed horizontally; the track member 33 is inclined forwardly and downwardly; and the track member 34 is again horizontal.

The purpose for this arrangement is to cause the retaining rings 19 on the flights 13 of the upper conveyor A to first be brought gently into edge to face relation with the flights 22 of the lower conveyor as they enter the bottom run of the upper conveyor, and to hold this relation while the adjacent conveyor runs travel parallel with each other through a predetermined portion of the processing period, and then to separate the adjacent runs of the two conveyors so that the articles 35 originally held by the retaining rings 19, will be gravitationally released from the same and deposited onto the flights 22 of the bottom conveyor.

It will be understood that the several conveyor chains rest gravitationally on their respective tracks or guide means, excepting only as they are held away from the guide means by the sprockets over which the chains pass. As shown in Fig. 1 the shaft 6 for the sprockets 4 is at a higher elevation than the shaft 5 for the sprockets 3 at the forward end of the machine. Thus, as the chains 1 and 2 of the upper conveyor approach the sprockets 4 at the rearward end of the machine, they are lifted away from the uppermost tracks or guides 26, 27. The tracks or guides 28, 29 for the lower run of the chains 1 and 2, however, are horizontally aligned with the teeth at the bottom side of the forward sprockets 3. Therefore, the chains 1 and 2 after passing over the sprockets 4 will sag and slant downwardly and forwardly to meet the supporting surface of the track members 28, 29, which terminate just to the rear of the point at which the chains 1 and 2 engage them.

For this reason the chain support member 31 for the top run of the lower conveyor, is slanted forwardly so as to be parallel with the inclination of the chains 1 and 2, and the guides or support members 32 extend parallel with the support members 28 and 29, for the remainder of the distance that it is desired to have the adjacent conveyor webs running parallel and at a constant predetermined distance apart.

The vertical spacing and location of the sprockets 4 and 10 is determined to accomplish this result as well as to provide the proper vertical spacing of the conveyor web surfaces, while they are traveling in the same direction and parallel with each other, and in this regard it will be noted that the adjacent web surfaces are spaced apart a distance substantially equal to the thickness of the retaining rings 19 so that when the webs come together in the parallel travel section the outer edges of the rings will touch the surfaces of the flights 22.

At a predetermined point in the top run of the lower conveyor, the conveyor support members 33 slant downwardly and forwardly so as to diverge from the horizontal support members 28, 29, and as shown in Figs. 1 and 4 this divergence is continued until the spread between the adjacent conveyor webs is sufficiently wide to permit complete separation of the articles 35 from the forming and retaining ring 19. From then on the adjacent runs or webs of the two conveyors run parallel with each other in uniformly spaced relation to the front end of the machine.

When the articles, now being carried by the top run of the lower conveyor, reach the forward end of the machine their grilling, baking, cooking or processing is completed, and at this point the articles are discharged gravitationally from the lower conveyor onto a laterally traveling conveyor 36, as the flights 22 of the lower conveyor turn over the sprockets 9. The lateral conveyor 36 is preferably of an open or wire rod type disposed at the lower portion of the front end of the machine, and arranged to deliver the product of the machine laterally therefrom. This delivery conveyor is preferably independently powered and it will be understood that this conveyor can be made to discharge from either side of the machine as operating convenience may dictate.

As shown in Fig. 1 the bottom run of the lower conveyor is supported on an angle member 37, extending longitudinally along each side of the machine, which angle member may be a part of the main supporting frame C of the machine. It will also be understood that the inwardly projecting leg or web of this angle member will be cut away at appropriate places to permit the passage of the lower conveyor flights 22, since the flights are mounted on the chains 7 and 8 so as to be carried in outwardly spaced relation therewith.

A particular feature of my improved continuous griddle, is the provision of means at the rearward end of the upper conveyor A for coacting with the product retaining rings 19, carried by the upper conveyor flights 13, to hold the product in the retaining rings and shape the outer surfaces of the products as the upper conveyor flights turn over the sprockets 14 to become inverted and to meet with the upper run flights 22 of the lower conveyor B. A particular function of this transfer means is to permit the inversion of the product retaining rings 19, and the gentle depositing of the products carried by the rings onto the flights 22 of the lower conveyor B, without any jarring, shock or other disturbance of the partially processed products at this point in their processing procedure, which is very important from the standpoint of the texture and cell or grain structure of the finished products and the retention or preservation of the gases created therein by the processing heat.

As shown in Figs. 6 and 7, this transfer means comprises a curved shoe or guide plate 38, which extends transversely of the machine between the top track members 26 and 27, and is carried by an angle bar 39 suitably secured to the support members 26 and 27. As shown this guide plate or shoe 38 is curved on a radius from the axis of the shaft 6, which carries the sprockets 4 at the rear end of the upper conveyor A, and the shoe 38 is positioned to extend along the path of the outer edges of the retaining rings 19, as they turn over the sprockets 4, with just sufficient clearance so that the rings will not rub. The lower margin of the shoe extends to a point adjacent the plane of the top run of the lower conveyor B having just sufficient clearance therefrom to pass the upstanding flanges 24 on the leading edges of the conveyor flights 22. Preferably the shoe or guide plate 38 is made with a smooth, polished or suitably coated surface on the side facing the retaining rings 19 so as to have a minimum friction coefficient that will permit the outer surfaces of the products 35, carried by the retaining rings, to slide therealong without any appreciable drag or pull which might adversely affect the outer end surfaces of the products. It will thus be seen that by means of the transfer shoe or guide plate 38, the products 35 become inverted and gently laid upon the flights 22 of the bottom conveyor B without any jar or shock whatsoever, and since the lower conveyor B is precisely timed with respect to the speed of the upper conveyor A, so that the flights of the two conveyors will meet and travel in precise registry with each other, the products 35 carried by the retaining rings 19 will be deposited on the centerline of the lower conveyor flights 22 with precisely the same order and lateral spacing that they had while being carried by the upper conveyor.

In the arrangement shown in Figs. 8 and 9, the transfer means is amplified by means of a power driven transfer apron or belt of endless construction arranged to travel over the inner surface of the shoe or guide plate 38, so as to provide a moving surface for engaging the products 35 carried by the retaining rings 19 during the transfer operation between the upper conveyor A and the lower conveyor B. As shown in Figs. 9, 10 and 11 the transfer belt 40 enters the guide shoe 38 at its upper end from a power driven roller 41, suitably mounted above the lateral supports or chain ways 26 and 27 for the top run of the conveyor A. The roller 41 is driven by a chain 42 which turns over a sprocket 43 fast on the shaft of the roller 41, and is in turn driven from any convenient powered portion of the machine, such as the lower conveyor B, in such a manner that the lineal speed of the belt 40 will be exactly the same as that of the outer edges of the retaining rings 19 carried by the upper conveyor A.

The belt or apron 40 is so arranged that, traveling in the direction of the arrow 44 in Fig. 9, the belt will lie against the forward curved surface of the guide shoe 38 so as to follow along the curved surface of the same to a point adjacent the lower end of the shoe 38, where it enters a transverse slot 45 formed in the shoe 38 and turns over a suitably disposed roller 46 and thence passes rearwardly to a second idler roller 47 where the belt direction is again changed to return to the drive roller 41.

As shown in Figs. 9 and 11, the downwardly extending bottom portion of the shoe 38, beyond the slot 45, is offset upwardly from the main body of the shoe so as to provide a nose or extension portion 48 which serves as a co-planar continuation of the outer surface of the belt 40 and thus extends the surface of the transfer means as close as possible to the working surfaces of the flights 22 of the lower conveyor B. This arrangement makes the transfer of the partially processed products from the upper conveyor A to the top run of the lower conveyor B, a substantially smooth, distortion free operation whereby the products being processed are delivered to the lower conveyor B without any shock or jar or other deteriorating effect.

The transfer apron or belt 40 may be made of any suitable material having sufficient body and flexibility so that it will travel along and against the forwardly curved surface of the shoe or guide plate 38, and for this purpose I have successfully employed a belt made of fibre glass as well as a light weight, closely woven, mesh-type wire conveyor belt. Since the belt or apron 38 is driven by the upper roller 41, the tension on the belt while it is being driven will be principally between the rollers 41 and 47. Thus with the belt being made of sufficient length to permit the necessary sag, between the roller 41 and the idler roller 46, to follow the surface of the curved shoe 38, the product engaging surface or portion of the traveling belt will be firmly supported by the shoe 38 so that the belt will not only hold the products being processed in the retaining rings 19 until they reach the surface of the flights 22 of the lower conveyor B, but will also shape the exposed surface of the product, projecting above the edges of the retaining rings 19, so that upon meeting the flights 22 of the bottom conveyor, the products will rest flatly thereon for a continuation of the grilling or baking process.

In the construction and arrangement of my improved continuous griddle shown in the drawings, the flights 13 and 22 of the conveyors A and B respectively, constitute the grilling or baking surfaces of the machine, and as shown in Figs. 1 and 5 of the drawings, these surfaces are heated by means of gas burners of the restricted ribbon flame type, which extend laterally across the machine, parallel with and immediately below the top runs of both conveyors. In the form shown the process burners are spaced at intervals from end to end of the top run of each conveyor, and each burner comprises a pipe 49 extending substantially from side to side of the machine and connected by means of a riser 50 with a suitable manifold, not shown. As shown in Figs. 1 and 2, each burner 50 is provided with a plurality of uniformly spaced, ribbon-type jets 51, which are parallel with the axis of the burner pipe 49 and which are spaced apart on centers equal to the center-to-center spacing of the retaining rings 19 as they are arranged along the center-line of the upper conveyor flights 13. Thus as the products 35 travel through the machine on both the upper and lower conveyors, the multiple heat sources will be directly on the lines of product travel thereby concentrating the heat directly against the surface areas of the conveyor flights on which the products are resting. As shown, the burners 49 are connected to the risers 50 on alternate sides of the machine, and two manifolds are provided, one on each side of the machine, so as to compensate for heat variation between successive jets 51 due to gas pressure drop between the burner ends. Thus successive burners will balance each other and provide substantially uniform heat from end to end of each conveyor flight. This disposition and the construction of the several burners serve to increase the effectiveness of the heat in so far as processing of the products is concerned and further serve to increase the efficiency of fuel utilization.

It will be understood that while such devices are not shown, each of the burners 49 will be provided with its own individual control valve for adjusting burner flame intensity in the individual burner jets, thus permitting adjustability of the successive burners along the path of travel through the machine in accordance with varying temperature requirements in the cooking, baking or grilling process of the particular products being handled. Also, it will be understood that each burner unit may be equipped with an individual pilot burner in the usual manner, and that the manifolds which supply the several burner units may be provided with safety valves for shutting off the fuel supply in the event that the supply pressure should fall below a predetermined safe value. Since these control and safety devices are commonly used and well known in the art they have not been illustrated herein.

It will also be understood that electrical heating elements may be employed if desired in place of the gas burner shown in Figs. 1 and 5 of the drawings.

As before mentioned the flights 13 and 22 of the two conveyors are formed of heavy gauge sheet metal and are made as relatively narrow plates or slats which extend substantially from side to side of the machine. These slats or plates are of uniform size, and are of a width sufficient to receive, between the leading and trailing edges, the largest size of retaining ring that is likely to be used. Also, as before mentioned the leading and trailing edges of each of the flights 13 are bent downwardly and inwardly so as to form an angle of about 60° with the bottom surface of the flight. This provides a flight in the form of an inverted channel having converging legs or sides, and the purpose is to trap the heat supplied by the burners or heating units over which the flights travel and thereby concentrate and retain the heat so as to minimize its loss through the space between successive flights.

In the case of the flights 22 of the lower conveyor B, only the trailing edge of the slat or plate is turned downwardly and inwardly, as shown in Fig. 3, since for other reasons it is preferable that the leading edge be turned upwardly. In this case the downwardly turned flange of each flight nevertheless forms with the flange of the next adjacent flight, an inverted channel for the entrapment and confinement of the processing heat. In the case of both types of conveyor flights, the flanges also serve the function of providing rigidity to the individual flight members so as to minimize any danger of warping or other distortion of the working surfaces of the flights.

In the operation of my improved continuous griddle, the several retaining rings 19 on each of the upper conveyor flights 13 are manually loaded at the front or left hand end of the machine as shown in Fig. 1, by placing proofed dough pieces of appropriate size in each of the retaining rings. These dough pieces are then progressively carried along the length of the top run of the upper conveyor A, and over the successive burners 49, whereby the first steps of processing the product are accomplished. For example, in the case of English muffins the passage over the top run of the upper conveyor A effects the rising or expansion of the dough pieces so that they fill the retaining rings 19, and the complete and uniform grilling of the bottom sides of the articles 35 thus formed. At the transfer station at the rearward end of the machine, the conveyor flight 13 and retaining rings 19 become inverted and the products are brought gently into engagement with the working surfaces of the flights 22 comprising the lower conveyor B. Since the two conveyors are traveling at the same speed, so that the flights of one will register with the flights of the other at the rear end of the machine or transfer station, the articles being processed will be laid on the centerline of the flights 22 in the same lineal arrangement that they had while traveling over their respective paths along the top run of the upper conveyor A.

Upon completion of the transfer operation the two conveyors run together for a predetermined distance, and then gradually separate as shown in Fig. 4 whereby the retaining rings become lifted away from the products 35 which have by this time attained a fixed form, and the products 35 are left alone to be carried by the lower conveyor flights 22, through the final processing stage, to the front end of the machine where they are discharged onto the delivery conveyor 36.

The particular function for the upwardly extending flanges at the leading edge of the lower conveyor flights 22, is to prevent any possibility of the partially processed products sliding onto the track or space between the successive conveyor flights 22 during the separation period when the top run of the lower conveyor B is shifted downwardly and away from the bottom run of the upper conveyor A.

During the passage along the length of the top run of the lower conveyor B, the product units 35 complete their internal baking and the top or previously exposed sides of the product units become grilled to the proper degree, which is preferably as near as possible to the same extent as the opposite sides of the product units were grilled or baked during the course of their run over the upper conveyor A. It will thus be seen that the end products produced by my improved machine can be uniformly grilled, cooked or baked to substantially the same degree on both sides, and that during the entire processing procedure the products, especially in their partially processed form, are handled without any shock, jar or other disturbance, so that the cell structure and texture of the products, as initially formed during the course of the run over the upper conveyor A, is maintained throughout the entire processing period and until the products are fully cooked and have become wholly stable. This results in a maximum retention of the gases produced within the product units during the initial processing phase, so that the finished products will be of uniform consistency.

The main advantages of this invention reside in the fact that substantially uniform end products are delivered from the machine, which end products have very superior characteristics of form, texture, grain and uniformity of cell structure, as compared with the products made in continuous production quantities by machines heretofore known; in the uniformity of shape and size and in the improved appearance of the products produced by my new machine; and in the greatly increased rate of production of superior quality products that can be obtained with the new machine.

Particular advantageous features of my improved continuous griddle are to be found in the use and arrangement of multiple forming rings on each flight of the upper conveyor, which forming rings are removable and interchangeable so that various sizes of rings for various sizes of end products may be employed; and in the fact that the forming rings permit the production of grilled products, uniformly finished on each end surface and having strong but bland sides. Other important features are to be found in the improved arrangement for the mechanical transfer of the articles being processed from the top conveyor to the bottom conveyor whereby the articles are automatically inverted without any jar, shock or other disturbance which might prevent the retention of the cell forming gases within the articles and cause disturbance of the size and distribution of the cells within the article; in the arrangement and distribution of the heat producing elements whereby the processing heat can be accurately controlled during each phase of the processing procedure, and applied directly along the centerline of product travel through the machine so that each one of the multiple units being processed will be treated to the same extent and degree; and in the construction and arrangement of the improved continuous griddle whereby a much improved product can be produced at an extremely high production rate.

Although but two specific embodiments of this invention are herein shown and described, it will be understood that numerous details of the construction shown may be altered or omitted without departing from the spirit of this invention as defined by the following claims:

I claim:

1. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, each of said webs comprising a succession of relatively narrow transversely extending sheet metal plates disposed in parallel edge-to-edge relation and each having a flat outer surface throughout its length, said plates having identical center-to-center relation along the lengths of both said webs, a plurality of individual open ended product retaining rings of uniform height mounted endwise on the outer surface of each of the plates of the upper conveyor web, and a unitary transversely extending transfer guide plate at the rearward end of the upper conveyor mounted adjacent the rearward sprocket shaft thereof and curved toward said conveyor on substantially the same radius as the path of the outer edges of said retaining rings as said conveyor turns around the said rearward sprocket shaft, the lower conveyor being disposed with its top run extending parallel with the bottom run of the upper conveyor for a predetermined distance adjacent the rearward end thereof and with the outer surfaces of the respective conveyor plates spaced apart vertically a distance substantially equal to the height of said retaining rings to close the adjacent ends thereof, said transfer guide plate terminating immediately above and in overhanging relation with the top run of said lower conveyor at a point inwardly of the respective rearward sprocket shaft.

2. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, each of said webs comprising a succession of relatively narrow transversely extending sheet metal plates disposed in parallel edge-to-edge relation and each having a flat outer surface throughout its length, said plates having identical center-to-center relation along the lengths of both said webs, a plurality of individual open ended product retaining rings of uniform height mounted endwise on the outer surface of each of the plates of the upper conveyor web, a unitary transversely extending transfer guide plate at the rearward end of the upper conveyor mounted adjacent the rearward sprocket shaft thereof and curved toward said conveyor on substantially the same radius as the path of the outer edges of said retaining rings as said conveyor turns around the said rearward sprocket shaft, the lower conveyor being disposed with its top run extending parallel with the bottom run of the upper conveyor for a predetermined distance adjacent the rearward end thereof and with the outer surfaces of the respective conveyor plates spaced apart vertically a distance substantially equal to the height of said retaining rings to close the adjacent ends thereof, said transfer guide means terminating immediately above and in overhanging relation with the top run of said lower conveyor at a point inwardly of the respective rearward sprocket shaft, and means intermediate the ends of the lower conveyor for increasing the vertical spacing between the bottom run of the upper conveyor and the top run of the lower conveyor to release gravitationally products held by said retaining rings for full exposure of such products to the surrounding atmosphere and for independent conveyance of such products by said lower conveyor during the remainder of the horizontal top run thereof.

3. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, each of said webs comprising a succession of relatively narrow transversely extending sheet metal plates disposed in parallel edge-to-edge relation and each having a flat outer surface throughout its length, said plates having identical center-to-center relation along the lengths of both said webs, a plurality of individual open ended product retaining rings of uniform height mounted endwise and in uniformly spaced center-to-center lateral relation on the outer surface of each of the plates of the upper conveyor web, a unitary transversely extending transfer guide means at the rearward end of the upper conveyor mounted adjacent the rearward sprocket shaft thereof and curved toward said conveyor on substantially the same radius as the path of the outer edges of said retaining rings as said conveyor turns around its said rearward sprocket shaft, the lower conveyor being disposed with its top run extending parallel with the bottom run of the upper conveyor for a predetermined distance adjacent the rearward end thereof and with the outer surfaces of the respective conveyor plates spaced apart vertically a distance substantially equal to the height of said retaining rings to close the adjacent ends thereof, and heat producing devices extending transversely beneath the top run of each of said conveyors and spaced at predetermined intervals therealong, said heat producing devices each comprising a plurality of heat sources spaced apart transversely of the respective conveyor web on the same centers as the lateral spacing of the retaining rings on the plates of the upper conveyor.

4. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, track means for supporting and guiding the top and bottom runs of each of said conveyor webs between the forward and rearward ends thereof, each of said webs comprising a succession of relatively narrow transversely extending sheet metal flights disposed in parallel edge-to-edge relation and having flat outer surfaces, said flights having identical center-to-center relation along the lengths of both said webs, a plurality of individual product retainings rings of uniform height mounted endwise on the outer surface of each of the flights of the upper conveyor web, a transversely extending transfer guide means at the rearward end of the upper conveyor mounted adjacent the rearward sprocket shaft thereof and curved toward said conveyor on substantially the same radius as the path of the outer edges of said retaining rings as said conveyor turns around its rearward sprocket shaft, said transfer guide means comprising a moving flexible belt of substantially the same width as the upper conveyor web and a downwardly and forwardly curved backing plate for holding said belt along the said path of the retaining ring outer edges, and means for driving said belt over the backing plate in the same direction and at the same lineal speed as the retaining ring outer edges travel, the lower conveyor being disposed with its top run extending parallel with the bottom run of the upper conveyor at the rearward end thereof and with the outer surfaces of the respective conveyor flights spaced apart vertically a distance substantially equal to the height of said retaining rings, said transfer guide means terminating immediately above the top run of said lower conveyor, and the track means for the bottom run of the upper conveyor and the top run of the lower conveyor diverging vertically at a predetermined distance from the rearward end of the upper conveyor to release products held by said retaining rings for separate conveyance by said lower conveyor along the remainder of the top run thereof.

5. In a continuous griddle having a horizontally disposed upper conveyor comprising an endless belt-like web having top and bottom runs and mounted to travel between forward and rearward sprockets rotating on respective forward and rearward parallel horizontal axes, and a lower conveyor comprising an endless web having top and bottom runs and mounted to travel substantially parallel with and in the direction opposite the said upper conveyor, the top run of the lower conveyor being spaced a predetermined distance below the bottom run of the upper conveyor at the rearward end thereof, means for transferring articles from the upper conveyor to the lower conveyor comprising a backing plate extending transversely across the rearward end of the upper conveyor and having a forwardly facing surface curving downwardly and forwardly adjacent the turn of the upper conveyor web around the rearward sprocket axis thereof, and a moving transfer belt mounted to travel downwardly along and against the said forwardly facing surface of the backing plate to a point adjacent the surface of the top run of said lower conveyor web, the outer surface of said transfer belt being spaced from the outer surface of the upper conveyor web a distance substantially equal to the height of the articles to be transferred from the upper conveyor to the lower conveyor.

6. In a continuous griddle having a horizontally disposed upper conveyor comprising an endless belt-like web having top and bottom runs and mounted to travel between forward and rearward sprockets rotating on respective forward and rearward parallel horizontal axes, and a lower conveyor comprising an endless web having top and bottom runs and mounted to travel substantially parallel with and in the direction opposite the said upper conveyor, the top run of the lower conveyor being spaced a predetermined distance below the bottom run of the upper conveyor at the rearward end thereof, means for transferring articles from the upper conveyor to the lower conveyor comprising a backing plate extending transversely across the rearward end of the upper conveyor and having a forwardly facing surface curving downwardly and forwardly adjacent the turn of the upper conveyor web around the rearward sprocket axis thereof and terminating closely adjacent the surface of the top run of the lower conveyor, a moving transfer belt mounted to travel downwardly across and against the said forwardly facing surface of the backing plate and then rearwardly from the bottom margin thereof, said backing plate having a transverse slot adjacent its bottom margin for passage of said transfer belt therethrough, and roller means for supporting said belt as it turns to pass through said slot.

7. In a continuous griddle having a horizontally disposed upper conveyor comprising an endless belt-like web having top and bottom runs and mounted to travel between forward and rearward sprockets rotating on respective forward and rearward parallel horizontal axes, and a lower conveyor comprising an endless web having top and bottom runs and mounted to travel substantially parallel with and in the direction opposite the said upper conveyor, the top run of the lower conveyor being spaced a predetermined distance below the bottom run of the upper conveyor at the rearward end thereof, means for transferring articles from the upper conveyor to the lower conveyor comprising a backing plate extending transversely across the rearward end of the upper conveyor and having a forwardly facing surface curving downwardly and forwardly adjacent the turn of the upper conveyor web around the rearward sprocket axis thereof and terminating closely adjacent the surface of the top run of the lower conveyor, a moving transfer belt mounted to travel downwardly across and against the said forwardly facing surface of the backing plate and then rearwardly from the bottom margin thereof, said backing plate having a transverse slot adjacent its bottom margin for passage of said transfer belt therethrough, and roller means for supporting said belt as it turns to pass through said slot, the bottom margin of said backing plate beyond said slot being aligned with the outer surface of said transfer belt as it travels across the curved forwardly facing surface of the backing plate.

8. In a continuous griddle having a horizontally disposed conveyor comprising an endless belt-like web having top and bottom runs and mounted to travel between forward and rearward sprockets rotating on respective parallel horizontal axes, a conveyor web comprising a plurality of relatively narrow transversely extending flat surfaced sheet metal plates connected serially edge-to-edge, a plurality of open ended product retaining rings of uniform height detachably mounted side-by-side on the flat outer surface of each of said plates and uniformly spaced along the length thereof, the corresponding rings on all said plates being aligned parallel with the longitudinal travel axis of said conveyor, and a plurality of transversely extending gas burning heaters disposed at intervals along the length of said conveyor directly below the top run thereof, said heaters each having a plurality of burner jets spaced apart transversely of the conveyor on the same centers as and directly below the respective center lines of travel of the rings as they are carried by the conveyor plates, whereby substantially only the area of the said plates occupied by each of said rings is directly contacted by the flame of the respective burner jet of each heater.

9. In a continuous griddle having a horizontally disposed conveyor comprising an endless belt-like web having top and bottom runs and mounted to travel between forward and rearward sprockets rotating on respective parallel horizontal axes, a conveyor web comprising a plurality of relatively narrow transversely extending flat surfaced sheet metal plates connected serially edge-to-edge, each of said plates having inwardly turned and converging longitudinal margins bordering its inner surface, a plurality of open ended product retaining rings of uniform height detachably mounted side-by-side on the flat outer surface of each of said plates and uniformly spaced along the length thereof, the corresponding rings on all said plates being aligned parallel with the longitudinal travel axis of said conveyor, and a plurality of transversely extending gas burning heaters disposed at intervals along the length of said conveyor directly below the top run thereof, said heaters each having a plurality of burner jets spaced apart transversely of the conveyor on the same centers as and directly below the respective center lines of travel of the rings as they are carried by the conveyor plates, whereby substantially only the area of the said plates occupied by each of said rings is directly contacted by the flame of the respective burner jet of each heater.

10. In a continuous griddle having a horizontally disposed conveyor comprising an endless belt-like web having top and bottom runs and mounted to travel between forward and rearward sprockets rotating on respective parallel horizontal axes, a conveyor web comprising a plurality of relatively narrow transversely extending flat surfaced sheet-metal plates connected serially edge-to-edge, a plurality of cylindrical open-ended product retaining rings of uniform diameter and height removably mounted endwise in side-by-side relation on the flat outer surface of each of said plates and along the length thereof, each of said rings being of uniform internal diameter from end to end and having integral external mounting lugs projecting radially outward from its side wall in the plane of its bottom end, and means for removably securing said lugs against the outer surface of the plate on which the rings are mounted.

*11. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, the upper conveyor web comprising a succession of relatively narrow transversely extending sheet metal plates disposed in parallel edge-to-edge relation and each having a flat outer surface throughout its length, said plates having identical center-to-center relation along the length of said web, a plurality of individual open ended product retaining rings of uniform height mounted endwise on the outer surface of each of the plates of the upper conveyor web, and a unitary transversely extending transfer guide plate at the rearward end of the upper conveyor mounted adjacent the rearward sprocket shaft thereof and curved toward said conveyor on substantially the same radius as the path of the outer edges of said retaining rings as said conveyor turns around the said rearward sprocket shaft, the lower conveyor being disposed with its top run extending parallel with the bottom run of the upper conveyor for a predetermined distance adjacent the rearward end thereof and with the outer surfaces of the respective conveyors spaced apart vertically a distance substantially equal to the height of said retaining rings to close the adjacent ends thereof, said transfer guide plate terminating immediately above and in overhanging relation with the top run of said lower conveyor at a point inwardly of the respective rearward sprocket shaft.*

*12. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, the upper conveyor web comprising a succession of relatively narrow transversely extending sheet metal plates disposed in parallel edge-to-edge relation and each having a flat outer surface throughout its length, said plates having identical center-to-center relation along the length of said web, a plurality of individual open ended product retaining rings of uniform height mounted endwise on the outer surface of each of the plates of the upper conveyor web, a unitary transversely extending transfer guide plate at the rearward end of the upper conveyor mounted adjacent the rearward sprocket shaft thereof and curved toward said conveyor on substantially the same radius as the path of the outer edges of said retaining rings as said conveyor turns around the said rearward sprocket shaft, the lower conveyor being disposed with its top run extending parallel with the bottom run of the upper conveyor for a*

*predetermined distance adjacent the rearward end thereof and with the outer surfaces of the respective conveyor webs spaced apart vertically a distance substantially equal to the height of said retaining rings to close the adjacent ends thereof, said transfer guide means terminating immediately above and in overhanging relation with the top run of said lower conveyor at a point inwardly of the respective rearward sprocket shaft, and means intermediate the ends of the lower conveyor for increasing the vertical spacing between the bottom run of the upper conveyor and the top run of the lower conveyor to release gravitationally products held by said retaining rings for full exposure of such products to the surrounding atmosphere and for independent conveyance of such products by said lower conveyor during the remainder of the horizontal top run thereof.*

*13. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, the upper conveyor web comprising a succession of relatively narrow transversely extending sheet metal plates disposed in parallel edge-to-edge relation and each having a flat outer surface throughout its length, said plates having identical center-to-center relation along the length of said web, a plurality of individual open ended product retaining rings of uniform height mounted endwise and in uniformly spaced center-to-center lateral relation on the outer surface of each of the plates of the upper conveyor web, a unitary transversely extending transfer guide means at the rearward end of the upper conveyor mounted adjacent the rearward sprocket shaft thereof and curved toward said conveyor on substantially the same radius as the path of the outer edges of said retaining rings as said conveyor turns around its said rearward sprocket shaft, the lower conveyor being disposed with its top run extending parallel with the bottom run of the upper conveyor for a predetermined distance adjacent the rearward end thereof and with the outer surfaces of the respective conveyor webs spaced apart vertically a distance substantially equal to the height of said retaining rings to close the adjacent ends thereof, and heat producing devices extending transversely beneath the top run of each of said conveyors and spaced at predetermined intervals therealong, said heat producing devices each comprising a plurality of heat sources spaced apart transversely of the respective conveyor web on the same centers as the lateral spacing of the retaining rings on the plates of the upper conveyor.*

*14. A continuous griddle comprising a pair of endless conveyors disposed one above the other in substantially horizontal relation, each of said conveyors having a belt-like web providing top and bottom runs and said webs traveling at the same speed in opposite directions between respective forward and rearward end sprockets carried by respective spaced parallel shafts, track means for supporting and guiding the top and bottom runs of each of said conveyor webs between the forward and rearward ends thereof, the upper conveyor web comprising a succession of relatively narrow transversely extending sheet metal flights disposed in parallel edge-to-edge relation and having flat outer surfaces, said flights having identical center-to-center relation along the length of said web, a plurality of individual product retaining rings of uniform height mounted endwise on the outer surface of each of the flights of the upper conveyor web, a transversely extending transfer guide means at the rearward end of the upper conveyor mounted adjacent the rearward sprocket shaft thereof and curved toward said conveyor on substantially the same radius as the path of the outer edges of said retaining rings as said conveyor turns around its rearward sprocket shaft, said transfer guide means comprising a moving flexible belt of substantially the same width as the upper conveyor web and a downwardly and forwardly curved backing plate for holding said belt along the said path of the retaining ring outer edges and means for driving said belt over the backing plate in the same direction and at the same lineal speed as the retaining ring outer edges travel, the lower conveyor being disposed with its top run extending parallel with the bottom run of the upper conveyor at the rearward end thereof and with the outer surfaces of the respective conveyors spaced apart vertically a distance substantially equal to the height of said retaining rings, said transfer guide means terminating immediately above the top run of said lower conveyor, and the track means for the bottom run of the upper conveyor and the top run of the lower conveyor diverging vertically at a predetermined distance from the rearward end of the upper conveyor to release products held by said retaining rings for separate conveyance by said lower conveyor along the remainder of the top run thereof.*

References Cited in the file of this patent or the original patent

UNITED STATES PATENTS

| | | |
|---|---|---|
| 1,760,979 | Ferry | June 3, 1930 |
| 1,869,232 | Weiland | July 26, 1932 |
| 2,045,957 | Loose | June 30, 1936 |
| 2,112,309 | Santillan | Mar. 29, 1938 |
| 2,373,076 | Engels | Apr. 3, 1945 |
| 2,640,444 | Reget | June 2, 1953 |
| 2,640,445 | Reget | June 2, 1953 |
| 2,660,109 | Hastings | Nov. 24, 1953 |
| 2,664,592 | Ingraham | Jan. 5, 1954 |
| 2,700,939 | Liston | Feb. 1, 1955 |

FOREIGN PATENTS

| | | |
|---|---|---|
| 154,070 | Australia | Nov. 10, 1953 |